United States Patent [19]

Read et al.

[11] Patent Number: 4,617,967
[45] Date of Patent: Oct. 21, 1986

[54] TWO-STAGE HYDRAULIC VALVES

[75] Inventors: John I. Read, Chichester; Raymond T. Roderick, Portsmouth, both of England

[73] Assignee: Vickers, Incorporated, Troy, Mich.

[21] Appl. No.: 561,031

[22] Filed: Dec. 13, 1983

[30] Foreign Application Priority Data

Dec. 13, 1982 [GB] United Kingdom ............... 8235516

[51] Int. Cl.⁴ ........................................... F15B 13/043
[52] U.S. Cl. .......................... 137/625.64; 137/596.17
[58] Field of Search ...................... 137/596.17, 625.64

[56] References Cited

U.S. PATENT DOCUMENTS 4,023,593 5/1977 Piccardo ..................... 137/625.64

Primary Examiner—Gerald A. Michalsky
Attorney, Agent, or Firm—Barnes, Kisselle, Raisch, Choate, Whittemore & Hulbert

[57] ABSTRACT

A fail-safe solenoid operated two-stage hydraulic spool valve has a pilot spool with four raised lands and is constructed in two parts (12, 13) urged away from each other by a spring (14). The pressure ports (16, 17) lie outside the pilot service ports (4, 5), and the tank gallery (15) is located between them. In normal operation, the solenoids (20, 21) hold the two spool portions (12, 13) together against the force of the spring (14). Should the electric supply to the solenoids fail, the spool portions (12, 13) are separated by the spring (14) thereby venting the service ports (4, 5) to tank, and thereby allowing the centring springs (31, 32) of the main stage to return the main spool (25) to its central position in which the load is hydraulically locked against movement.

4 Claims, 4 Drawing Figures

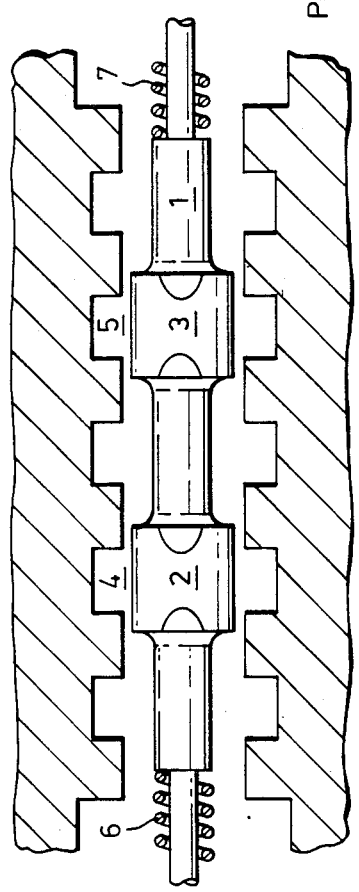
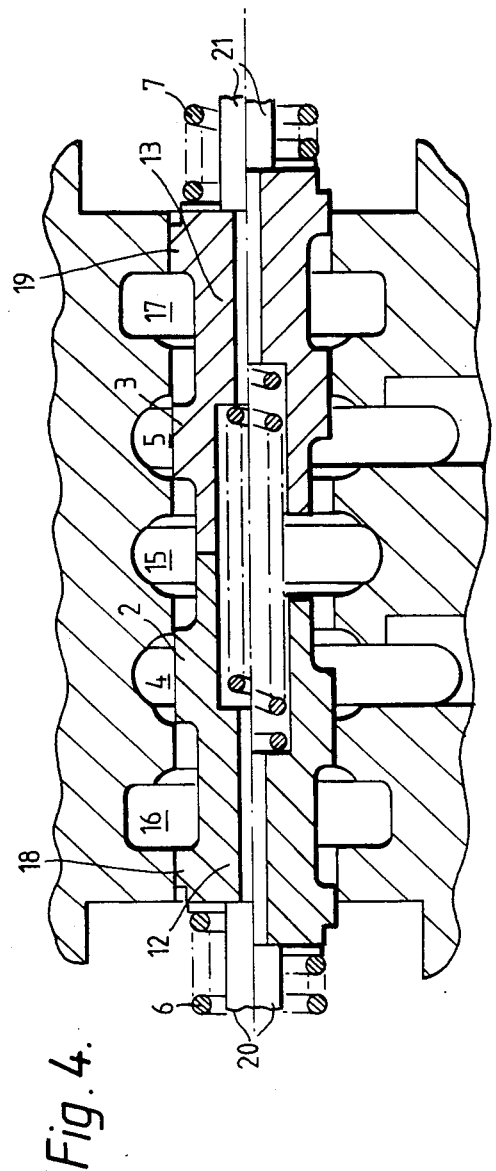
Fig. 1. PRIOR ART
Fig. 4.

TWO-STAGE HYDRAULIC VALVES

The present invention relates to solenoid-operated, two-stage proportional directional control spool valves.

Solenoid-operated proportional valves normally have a spool acted on by a solenoid at each end and provided with centring springs. Should the electrical supply to the solenoid fail, the spool is brought to its central position by the springs, in which the lands of the spool seal the service ports so that the load is hydraulically locked in position. A single-stage valve is thus failsafe in respect of an electrical failure.

In a two-stage proportional valve, however, there is a possibility that the electrical supply to the solenoids might fail during operation at an instant when the main spool is displaced from its central position. If the pilot spool is centred, the main spool can only return to centre very slowly, fluid flowing through the pilot circuit, the pilot valve usually being constructed with a slight underlap. During this time the lands of the main spool do not seal the service ports, so that the load is free to move giving rise, in many cases, to a highly dangerous situation.

It is an object of the present invention to provide an improved construction of two-stage proportional valve in which, on failure of the electrical supply to the pilot stage solenoids, the main spool is rapidly centred, thus hydraulically locking the load against further movement.

The pilot stage spool of the prior art proportional valve normally has two raised lands sealing the pilot service ports. A pressure gallery connected to the high pressure supply is provided between the lands, and galleries at tank pressure are provided on the outside of the lands. Displacement of the pilot spool by the resultant force of the solenoids at its two ends thus puts one pilot service port into communication with the supply, and the other into communication with the tank, supplying appropriate pressures to the ends of the main valve spool.

According to the present invention there is provided an electrically operated two-stage hydraulic spool valve comprising a main stage spool provided with centring springs, and a solenoid-operated pilot stage spool having a solenoid acting on at least one end, characterised in that the tank port of the pilot stage is situated between the pilot service ports, and the pressure supply ports are outside the pilot service ports, and in that the pilot spool is in two parts urged apart by a spring so that on failure of the electrical supply to the solenoid, or at least one of the solenoids, the parts of the pilot spool separate, thereby venting the pilot service ports to the tank port.

Thus the invention involves a modification of the known pilot stage, whereby the function of the galleries is interchanged, the tank pressure gallery being between the pilot service ports and the supply ports being outside the service ports. The pilot valve spool has four raised lands, and is constructed in two parts urged away from each other by a spring. In normal operation, the force of the or each solenoid holds the two portions of the pilot spool together against the action of the spring, and the pilot stage operates in the normal way, but of course with opposite polarity. However, should the electrical supply to the solenoid, or at least one of the solenoids fail, the spring is sufficiently powerful to urge the two parts of the pilot stage spool apart, uncovering the pilot service ports and venting them to tank. The pilot pressures at the ends of the main spool are reduced immediately to tank pressure, and the main spool is centred by its centring springs, thus hydraulically locking the load.

A two-stage hydraulic spool valve in accordance with the invention will now be described in greater detail, by way of example, with reference to the accompanying drawings, in which:

FIG. 1 shows a prior art pilot stage spool and porting for a two-stage valve,

FIG. 4 is a composite drawing showing diagrammatically the pilot spool and porting of the valve of FIG. 3 in both its normal operating condition and its fail-safe condition.

Referring first to FIG. 1, the prior art pilot stage comprises a spool 1 having two raised lands 2 and 3 which cooperate with pilot service ports 4, 5. Solenoids (not shown) act on the two ends of this spool and are energised differentially to operate the valve. The spool is urged towards its centred position by captive centring springs, shown very diagrammatically at 6 and 7.

In this prior art spool, if the electrical supply to the solenoid should fail, these springs centre the spool, thus sealing the ports 4 and 5, and if this failure should occur when the main spool is displaced from its centred position, then the main spool will be hydraulically locked in its displaced position and hence drives the load at the previously selected rate. Therefore, this is not a fail-safe situation. Normal underlap in the pilot valve will eventually result in centring of the main spool under the action of its own centring springs but the time taken for this to happen can be dangerously long.

Figure 2:
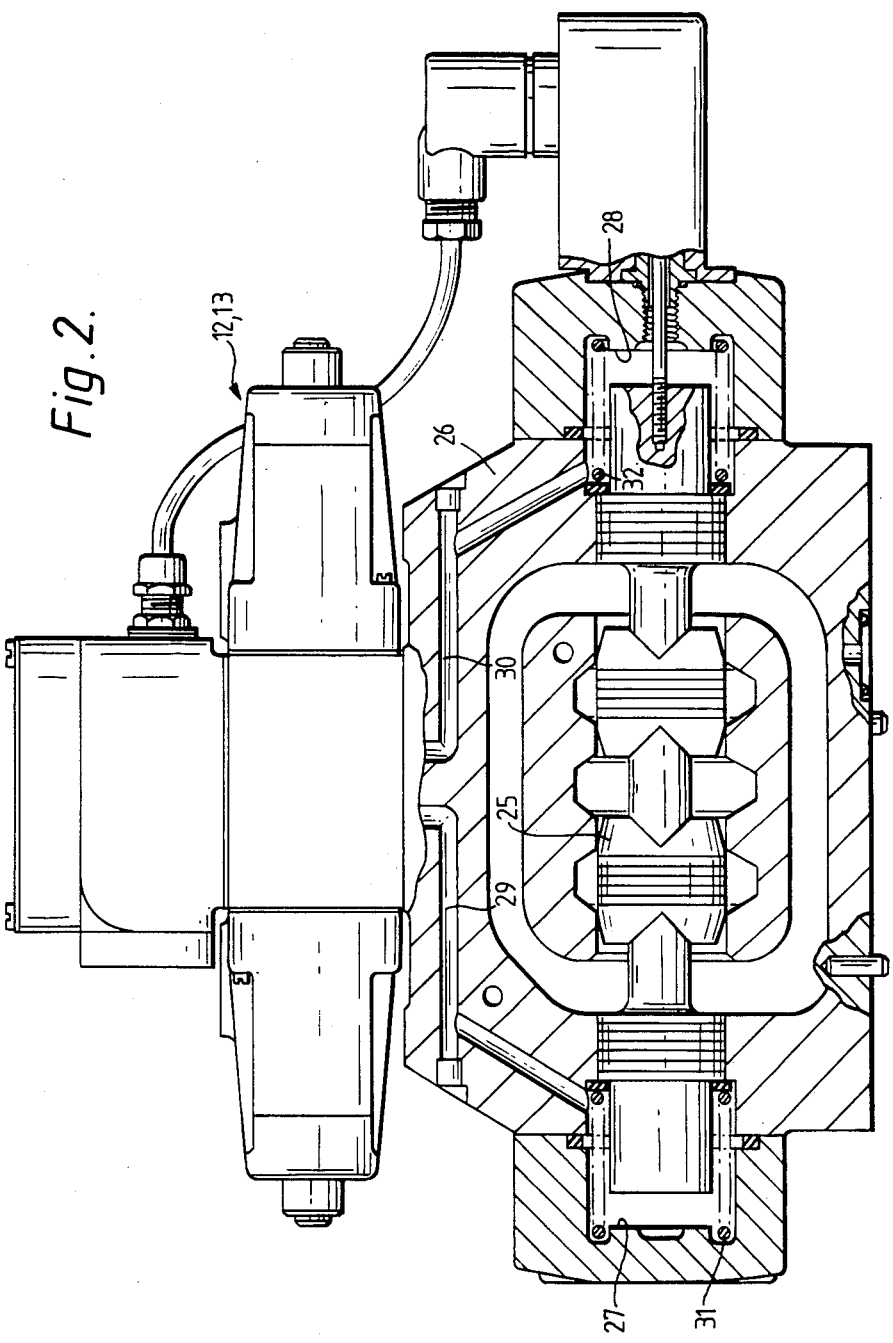
FIG. 2 is a view of the overall two-stage, with the main stage being shown in section.
Figure 3:
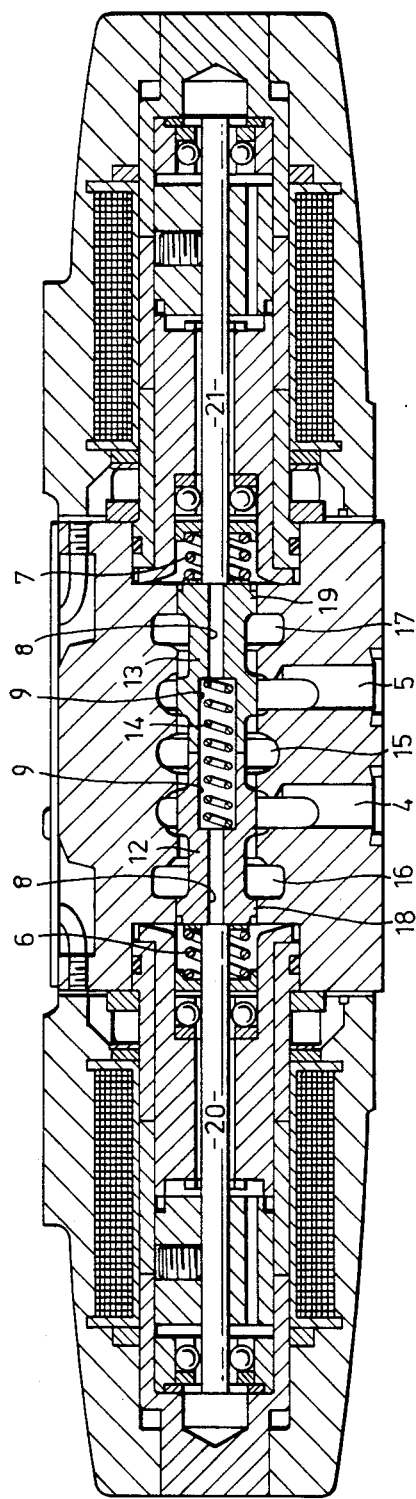
FIG. 3 is an enlarged axial section through the pilot stage of the two-stage valve of FIG. 2.

FIG. 2 shows the overall two-stage valve in accordance with the invention with only the main stage shown in section as FIG. 3 shows an enlarged sectional view of the pilot stage. The main stage comprises an overlapped spool 25 provided in a body 26 have end chambers 27 and 28 to which fluid under pressure can be supplied via channels 29 and 30, respectively, leading from the pilot stage pressure ports 4 and 5. The spool 25 is fitted with two centring springs 31 and 32.

FIG. 3, as already mentioned, is a section through the pilot stage of the valve of the invention, and FIG. 4 in its upper part shows diagrammatically the pilot valve in its normal operating condition. The pilot spool consists in accordance with the present invention, of two separable portions 12, 13 urged apart by a spring 14 which is powerful enough to overcome the centring springs 6 and 7 at the ends of the spool. Each spool portion 12, 13 has a through bore 8 and a counterbore 9, the two counterbores 9 together forming a chamber within the spring 14 is housed, the ends of the spring abutting the steps between the through bores and the counterbores. The arrangement of the porting is somewhat different from the prior art pilot stage of FIG. 1 in that the tank gallery 15, instead of the pressure gallery, is located between the pilot pressure service ports 4 and 5, and the supply ports 16 and 17 are external to these.

This arrangement necessitates the provision of an extra pair of lands 18, 19 in addition to the lands 2 and 3 which close the service ports. The lands 18, 19 seal off the oressure supply in the galleries 16 and 17 from the end spaces of the valve which contain the centring springs 6 and 7 and the solenoid armatures 20, 21, these end spaces being at tank pressure.

The lower part of FIG. 4 shows the condition of the pilot stage when the electrical supply to the solenoids has been interrupted. The spring 14 is strong enough to overcome the centring springs 6 and 7 and separate the two halves of the pilot stage spool. Directly this happens, it opens a communication between the pilot pressure ports 4 and 5 and the tank gallery 15, immediately reducing the pilot pressure to tank pressure and thereby allowing the main spool 25 to become centred by its own centring springs 31, 32. In that position the lands of the main spool 25 close its service ports 33 and 34, so that the load (not shown) is immediately hydraulically locked and prevented from moving. Restoration of the electrical power supplies to the solenoids forces the two halves 12, 13 of the pilot spool inwards against the spring 14, and immediately restores the valve to normal operation.

Although a valve in accordance with the invention could function without pilot spool centring springs, it is preferable that they should be provided. It will also be appreciated that the pilot stage spool may be controlled by a single solenoid acting on one end against a spring acting on the other end. However, in many instances it is preferable to employ a solenoid at each end of the pilot stage spool.

I claim:

1. Electrically operated two-stage hydraulic spool valve comprising a main stage having a main spool, centring springs acting on said main spool, a pilot stage having a pilot spool, and at least one solenoid acting on an end of said pilot spool to control the operating position of the latter, said pilot stage comprising a tank port, two supply ports and two service ports, said tank port being disposed between said service ports and said service ports being disposed between said supply ports, said pilot spool comprising two parts, a spring interposed between said parts and urging said two parts apart in a direction axially of said pilot spool so that on deenergisation of the solenoid, said parts of said pilot spool separate under the action of said spring to provide an interconnection between said pilot service ports and said tank port.

2. A valve according to claim 1, wherein said pilot spool parts are formed with bores extending from adjacent faces of said parts, said bores together forming a chamber which houses said spring.

3. A valve according to claim 1 or 2, including centring springs acting on said pilot spool.

4. A valve according to claim 1, including a second solenoid acting on the other end of said main spool to control the operating position thereof.

* * * * *